BIDIRECTIONAL ELECTRONIC PHASE SHIFTER

Filed July 15, 1966 3 Sheets-Sheet 1

INVENTORS.
DON I. HIMES
BY GABOR SCHLISSER
Leonard Holtz
AGENT

INVENTORS.
DON I. HIMES
BY GABOR SCHLISSER
Leonard Holtz
AGENT

BIDIRECTIONAL ELECTRONIC PHASE SHIFTER

INVENTORS.
DON I. HIMES
BY GABOR SCHLISSER
Leonard Holtz
AGENT

United States Patent Office 3,482,171
Patented Dec. 2, 1969

3,482,171
BIDIRECTIONAL ELECTRONIC PHASE SHIFTER
Don I. Himes, Nutley, and Gabor Schlisser, Teaneck, N.J., assignors to International Telephone and Telegraph Corporation, Nutley, N.J., a corporation of Maryland
Filed July 15, 1966, Ser. No. 565,608
Int. Cl. H03k *5/18*
U.S. Cl. 328—155 11 Claims

ABSTRACT OF THE DISCLOSURE

To provide a predetermined phase shift to a pulse signal of frequency F from an input source, said source is first coupled to a circuit wherein said signal is modified by the addition or subtraction of pulses, depending upon the phase shift desired. Said modified signal is coupled to a first input of a first mixer via a circuit which divides said modified signal by N. Said input signal is secondly coupled to a first input of a reference mixer directly and to a second input of said reference mixer via a circuit which divides said pulse signal frequency by N. The output of said reference mixer is connected to the second input of said first mixer, the output thereof providing a frequency F signal, said signal being phase shifted by a predetermined number of degrees.

This invention relates to electronic phase shifters and more particularly to bidirectional electronic phase shifters.

In present instrumentation and communication equipment, phase lock control system are widely employed. The essential component of such phase lock control loops is the phase shifter, the function of which is to correct the phase of one signal so that it is in a given phase relation with a reference signal. To perform this function, the phase shifter must be capable of shifting the phase in either direction. In conventional servo-mechanism systems this function is performed by an electro-mechanical phase shifter which is usually designed to operate at a single frequency. Such devices require a servo-motor to drive them, which in turn must be driven by an amplifier. These three components are quite unreliable and bulky and therefore, not suitable for use in miniaturized systems.

Accordingly, it is the main object of this invention to provide an improved bidirectional electronic phase shifter that does not utilize servo-motors or magnetic amplifiers or the like.

An electronic phase shifter according to this invention comprises a source of an input pulse train at a given frequency, means for changing the number of pulses in said train and a dividing means for dividing the number of pulses in the changed pulse train for providing a phase shift.

The above-mentioned and other objects of this invention will become apparent by reference to the following description taken in conjunction with the accompanying drawings in which.

Briefly, this invention is based on inserting a given amount of phase shift (either positive or negative) to an input pulse train having a given frequency F of either inserting or deleting a pulse (or pulses) from the input pulse train. The resulting pulse train is applied to a frequency divider of division factor N (a recycling counter for example) to provide an output signal having a frequency $F/N$. This practice results in an advancement or retardation in time of the pulse train of frequency $F/N$ by a time value of $1/F$ for each pulse added or deleted from the input pulse train of frequency F. Although the advancements or retardations in the $F/N$ frequency signal are the same as those of the F frequency signal to the *time* domain, when these changes are expressed in degrees at the respective frequencies, the change in degrees at the $F/N$ frequency is seen to be 1/N times the change in degrees at the frequency F. Then this lower frequency ($F/N$) is translated back to the higher frequency F by means of a mixing device. The output of this mixing device has a higher frequency than the divided down frequency $F/N$ and also has the same amount of phase shift *in degrees* as the $F/N$ signal. This results in a given phase shift (in the *time* domain) being converted to a smaller phase shift (in the *time* domtain) since the angular phase shift in *degrees* is the same at the lower and higher frequencies.

Figure 1:
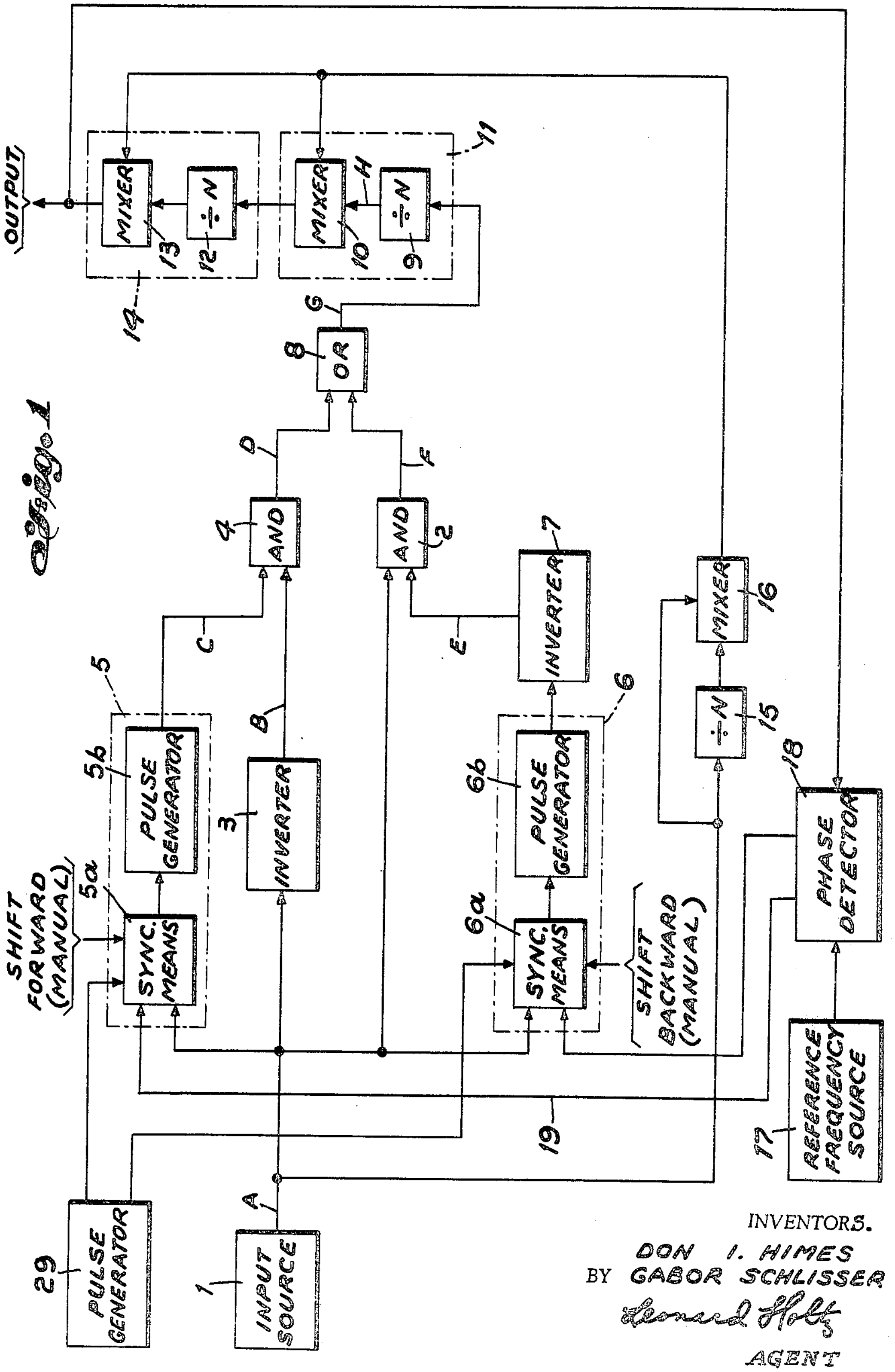
FIG. 1 is a block diagram of a bidirectional phase shifter according to this invention.

Referring to FIGURE 1, a specific embodiment of this invention is illustrated wherein a source of input pulse train 1 providing a pulse train of frequency F is coupled to divider 15 and to one input of mixer 16. The output of divider 15 is coupled to another input of mixer 16. The output of source 1 is also coupled directly to AND-gate 2 and is coupled to AND-gate 4 via inverting amplifier 3. Coupled between another input of AND-gate 4 and source 1 is pulse means 5 for selectively providing additional pulses between pulses produced by source 1. Pulse means 6 is coupled between source 1 and another input of AND-gate 2 via inverting amplifier 7 for selectively deleting pulses from the output of source 1. Pulse means 5 and 6 each include the series combination of a synchronizing means 5*a* and 6*a*, respectively, and a pulse generating means 5*b* and 6*b*, respectively. The outputs of AND-gates 2 and 4 are applied to OR-gate 8, the output of which is applied to dividing means 9 which provides an output pulse for every N pulses applied thereto. The output of dividing means 9 is coupled to one of the inputs of mixer 10, the output of mixer 16 being coupled to the other input of mixer 10. The frequency of the output of mixer 10 is equal to the sum of the two frequencies applied thereto, and in this particular case is equal to the input frequency, F. Divider 9 and mixer 10 comprise a "phase shift conversion means" 11, a term which is used throughout this specification for ease of identification of this particular combination of elements. Phase shift conversion means 11 and 14 are identical and are coupled together in series as shown in FIGURE 1. The output of the last phase shift conversion means 14 is a signal of frequency F having a given phase shift. The phase shift of the signal appearing at the output of mixer 13 will be equal to $\Phi/N^M$ degrees, where N is the division factor of each dividing means and M is the number of series coupled phase shift conversion means (11 and 14 for example), assuming that all the dividing means within the phase shift conversion means divide by the same integer.

Operationally, the output pulse train of source 1 having a given frequency F is converted to a frequency $F(N-1)/N$ by means of divider 15 and mixing 16. Pulses are either selectively deleted or added between the signal pulses of frequency F by means of gates 2, 4 and 8, inverters 3 and 7 and pulse means 5 and 6. The particular combination of elements shown in FIGURE 1 for adding or deleting pulses from the output of source 1 is shown merely by way of example. It is understood that other methods for obtaining the desired addition or deletion of pulses may be devised within the spirit of this invention by one ordinarily skilled in the art.

Figure 2:
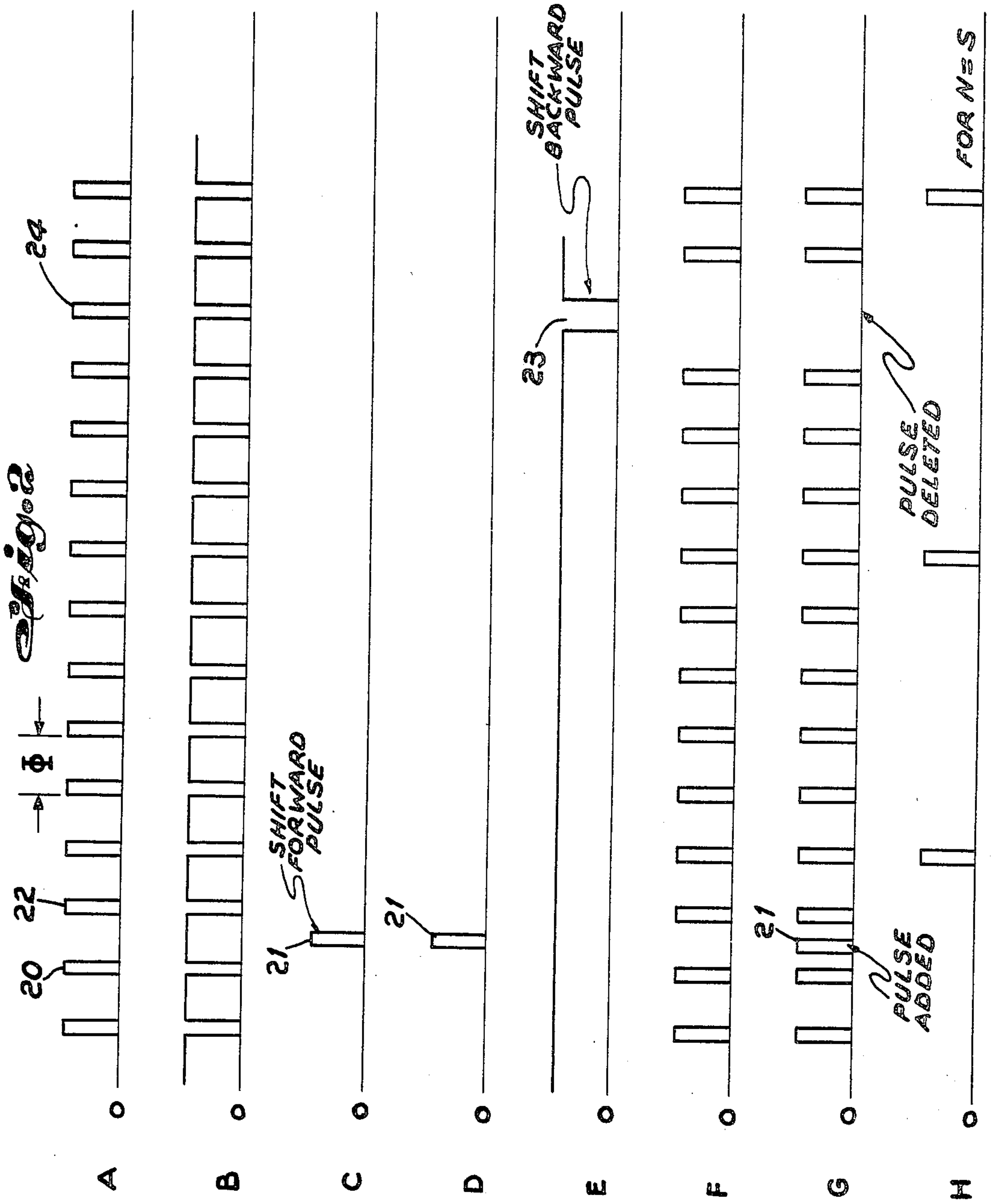
FIG. 2 is an illustration of typical waveforms appearing at designated points in the shift control portion of the phase shifter of FIG. 1.

The number of pulses added or deleted from said train determines the amount phase shift at the output of the circuit. For example, referring to FIG. 2, assume that one pulse 21 is added between pulses 20 and 22 of the signal appearing at the output of source 1 (FIGURE 2A) by activating pulsing means 5. The insertion of pulse 21 effectively adds a phase shift of Φ degrees to the pulse train of FIG. 2(A) after it is divided down by divider 9 (see FIGURE 2(H) where the division ratio N is shown as being equal to 5), where Φ is equivalent in degrees to one cycle of the waveform of frequency F shown in FIG. 2(A). This phase shift of Φ degrees at a frequency F is equivalent to a phase shift of $\Phi/N$ degrees at the frequency $F/N$. Therefore, the phase shift of the signal at the output of divider 9 is $\Phi/N$ degrees of the frequency $F/N$. The insertion of pulse 21 introduced a positive phase shift (i.e., in the forward direction). If one desires to shift the phase in the backward direction, then a pulse is deleted from the pulse train of FIG. 2(A) by activating pulsing means 6. The waveforms involved in a shift backward operation are also illustrated in FIG. 2, and in particular in FIG. 2(E), (F) and (G). As seen from FIG. 2, the requirements for pulsing circuits 5 and 6, which are for inserting or deleting a pulse from the output of source 1, respectively, are that the output pulse (see pulse 23, FIGURE 2(E)) of the shift backward pulsing means 6 be wide enough to overlap one of the output pulses of source 1 and that the output pulse of the shift forward pulsing means 5 must occur between the output pulses of source 1. Therefore pulsing means 5 and 6 include synchronizing circuits **5*a* and 6*a*, respectively, to insure that the pulses occur in the proper time slots. This synchronizing mechanism is not shown in detail in the figures since it should be clear to one ordinarily skilled in the art how to carry this out. For example, simple digital gating techniques could be used for gating the shift forward or backward information with the output of source 1 to the AND-gates 2 and 4, and differentiating or multivibrator circuits could be utilized to provide the output pulses for pulse generator 5*b* and 6*b***.

The following discussion will be based on the operation of the instant invention in the shift forward mode; e.g., when one pulse 21 is added between pulses 20 and 22 out of the output of source 1. The deletion of pulse 24 from the pulse train as shown in FIGURE 2(A) will be ignored for the purposes of the example. The output of OR-gate 8, illustrated in FIG. 2(G), is applied to divider 9, the basic frequency of the output of OR-gate 8 being F. Divider 9 provides one output pulse for every N input pulses applied thereto, thereby providing an output frequency of F/N. Therefore, if a pulse (such as pulse 21) is added to the signal appearing at its input, divider 9 will provide an output pulse train of frequency $F/N$ and shifted in phase by an amount equal to $\Phi/N$ degrees, where Φ is equivalent in degrees to one cycle of the basic frequency F, or 360 degrees. The output of divider 9 having a frequency $F/N$ and the output of mixer 16 having a frequency $F(N-1)/N$ are applied to mixer 10 which adds these frequencies, thereby producing a signal having the frequency F and still having a phase shift of $\Phi/N$ degrees but at the frequency F. Therefore, it is seen that the addition of one pulse by means of pulsing means 5 which provided a phase shift of $\Phi/N$ degrees at a frequency $F/N$ at the output of divider 9 has now been converted by means of phase shift conversion means 11 to a phase shift of $\Phi/N$ degrees at a higher frequency F.

In order to reduce this phase shift to a smaller value (in degrees), the output of mixer 10 is applied to an additional phase shift conversion means 14. Phase shift conversion means 14 will divide the degrees of phase shift of the signal appearing at its input by the division factor of the dividing circuit 12 (in this example, all of the division circuits divide by N). For example, the output of divider 12 is a pulse train of frequency $F/N$ and shifted in phase by an amount $\Phi/N^2$ degrees. This frequency is then raised by means of mixer 13 back to the frequency F which also now has a phase shift of $\Phi/N^2$ degrees, but at the frequency F. Note that phase shift conversion means 14 has divided the degrees of phase shift of the signal appearing at its input by an amount N, the division factor of the dividing means 12 contained therein. If one desires to reduce the phase shift further all that is necessary is to provide more phase shift conversion means series coupled to means 14. Therefore, at the output of the last phase shift conversion means the frequency will still be equal to F but shifted by an amount equal to $\Phi/N^M$ degrees where M is equal to the number of phase shift conversion means utilized.

Note that the output frequencies of the phase shift conversion means 11 and 14 are identical and are equal to F. This is due to the presence of divider 15 and mixer 16, divider 16 dividing by the quantity N, where N is also the division factor of the dividing means 9 and 12 within the phase shift conversion means 11 and 14 and also of any extra dividers in any phase shift conversion means that are added on to decrease the incremental phase shift.

It should be clear from the foregoing that the more phase shift conversion means that are employed, the smaller will be the incremental phase shift per pulse selectively added or deleted by pulsing means 5 and 6. It is also clear that the division circuits contained in phase shift conversion means 11 and 14 may be designed to divide by any integer, all of them being shown dividing by N in FIG. 1 merely by way of example and for ease of explanation. For example, if dividing means 9 was to divide by N and dividing means 12 to divide by X, the output signal would have a resulting phase shift of $\Phi/NX$ degrees for each pulse either added or deleted by pulsing means 5 and 6. In this case, appropriate additional dividers would have to be coupled between the mixers 10 and 13 and source 1 or between mixers 10 and 13 and divider 27 in order to provide an output frequency of F.

It should be noted that the instant phase shifter is capable of providing an output signal having any desired frequency within predetermined limits merely by changing the division factor of dividers 9 and, or, 12. It should be clear that by proper design of these dividing circuits many different frequency outputs are attainable. Another way to change the frequency output of the phase shifter is to change the mixing frequency input to mixers 10 and/or 13 in order to provide a different frequency at their outputs. In this case, when the inputs to the mixers are changed, the resulting phase shift *in degrees* is not changed, whereas when the division factors of the dividers 9 and 12 are varied then the resulting phase shift *in degrees* will be changed. These modifications, if desired, may be made within the spirit of this invention by anyone reasonably skilled in the art.

It is pointed out that the instant phase shifter has many applications other than as a basic phase shifter. For example, as also shown in FIGURE 1 the phase shifter may be utilized in a phase-locked loop by inserting a phase detector 18, the inputs of which are coupled to the output of phase shift conversion means 14 and to a reference frequency source 17. The outputs of phase detector 18 are coupled to pulse means 5 and 6. Phase detector 18 checks the phase difference between the output of the phase shifter and the reference source and provides an activating signal to either pulse means 5 or pulse means 6, in order to either add a pulse or delete a pulse from the signal produced by source 1 in order to vary the phase shift of the output of the phase shifter accordingly. For example, if phase detector 18 detects that the output of the phase shifter is falling behind the output of reference frequency source 17, a shift forward signal is coupled to pulse means 5 via lead 19 and which causes a pulse to be added in between two pulses of the output of source 1 in order to provide a positive phase shift. This procedure is periodically repeated until the output of the phase shifter and the output of reference frequency source 17 are in phase. Note that this particular configuration can also be utilized to provide a constant phase difference between two signals (such as between the output of the phase shifter and the output of the reference frequency source 17). In this case, phase detector 18 is designed so that a signal will be fed to the shift forward pulse means 5 if the phase difference between the two signals is below a predetermined value and a signal will be transmitted to the shift backward pulse means 6 if the phase shift between the two signals exceeds said predetermined value. Thus, a constant phase shift is maintained between the output of the phase shifter and the output of reference frequency source 17. The design of phase detector 18 is straight forward and well known, such detectors being widely used in the art. Therefore a further description thereof is deemed unnecessary.

The apparatus described with reference to FIG. 1 may also be utilized as a precision frequency source. By continuously varying the phase shift by repeatedly periodically inserting or deleting pulses at a constant rate a precision constant frequency output may be obtained at the output of the phase shifter which is different from the input frequency F. By changing the rate of change of the addition or subtraction of phase shift, the output frequency of the phase shifter is accordingly changed. In order to carry this out, means 29 is coupled to pulse means 5 and 6 for selectively providing said continuously varying phase shift by repeatedly periodically pulsing said pulse means 5 or 6 in order to periodically insert or delete pulses from the input pulse train of frequency F. Means 29 may be any type of adjustable periodic trigger generator presently known in the art which is compatible with the electronics of the pulse means 5 and 6.

Figure 3:
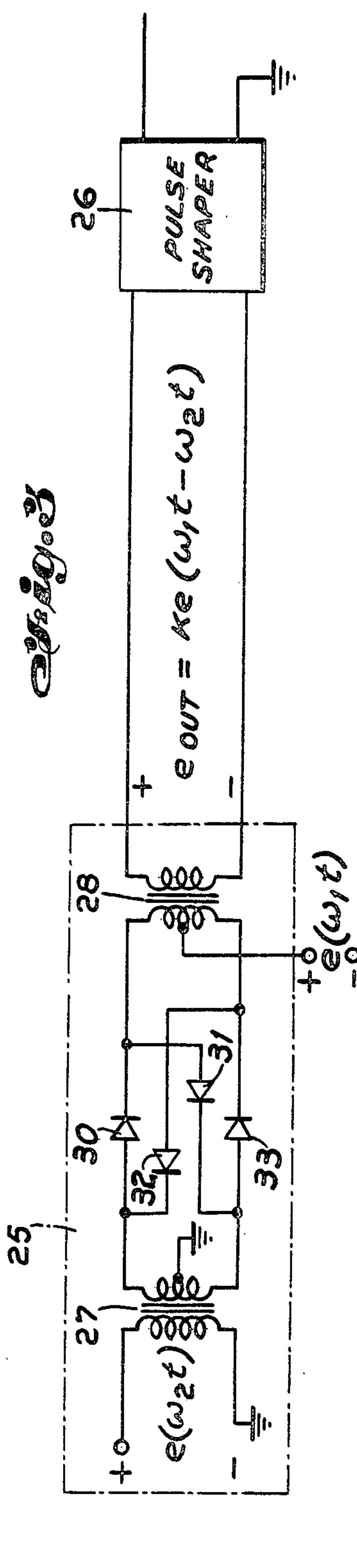
FIG. 3 is a schematic and block diagram of a typical mixing circuit for use in the phase shifter of FIG. 1.

Referring now to FIG. 3, a typical mixing circuit for use in the system shown in FIG. 1 is illustrated. This is a well known circuit and is described fully in many textbooks. Therefore, a detailed description of the operation thereof is not deemed necessary in order to describe the instant invention. Suffice it to say that the output of the mixer illustrated in FIG. 3 provides outputs having a frequency equal to the sum and the difference of the frequencies applied thereto. The output of balanced mixing circuit 25 is coupled to a pulse shaper 26 in order to provide an appropriate signal for application to the dividing circuits as illustrated in FIG. 1. Again, pulse shaping circuits are well known in the art and the design thereof should be obvious to one reasonably skilled in the art. The mixers shown in FIG. 1 comprise the series combination of a balanced mixer 25 and a pulse shaper 26 as illustrated in FIGURE 3.

Figure 4:
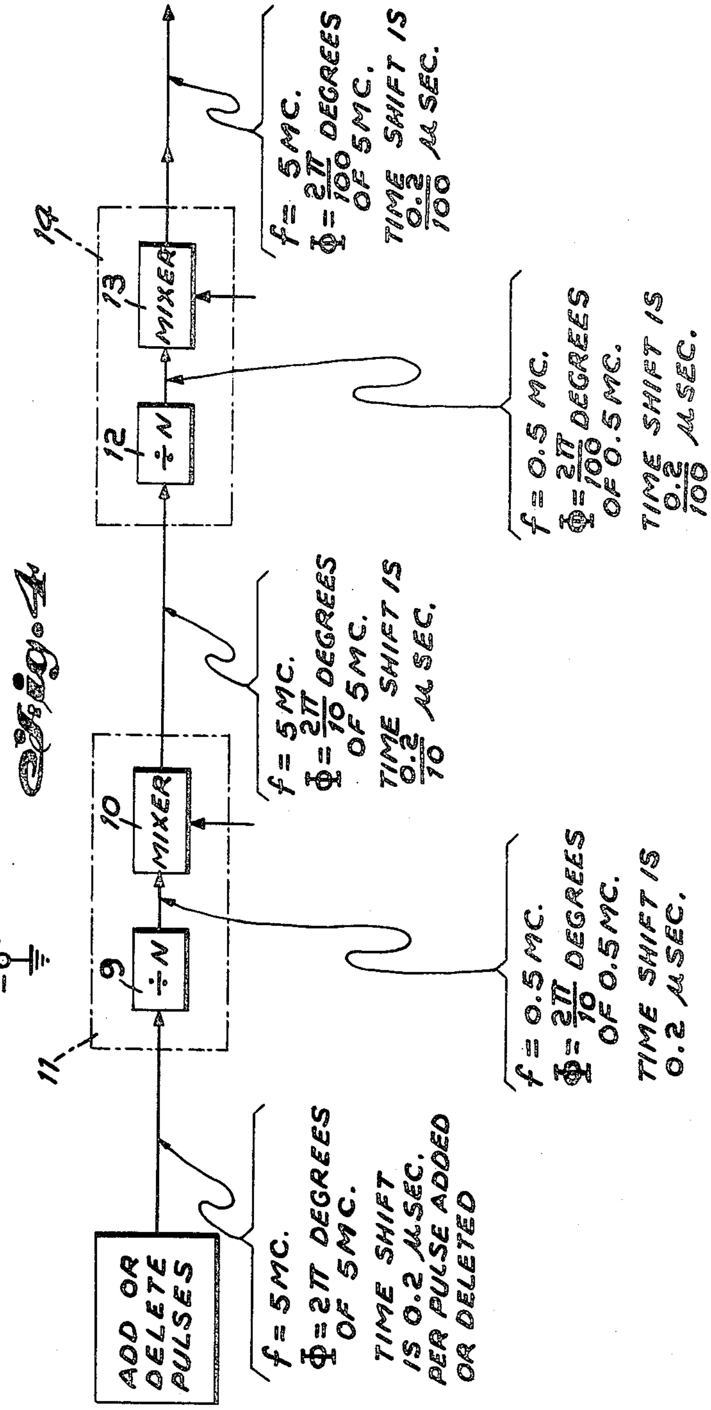
FIG. 4 is a partial block diagram of the system of FIG. 1 utilizing particular numerical values.

Referring to FIGURE 4, a specific numerical illustration of the operation of the two phase shift conversion means 11 and 14 of FIGURE 1 is given. The output of the second phase shift conversion means 14 is shown applied to mixer 19 in this specific example for ease of illustration. In this case $F=5$ mc., $N=10$ and $M=2$. It is clearly seen from this illustration that each division operation divides the *degrees* of phase shift by 10 while maintaining the same *time* phase shift while each mixing operation translates the *time* phase shift while maintaining the same *degrees* of phase shift. The final output has a frequency F and is shifted in phase, by $2\pi/100$ degrees (at the frequency F) and shifted in time by 0.2/100 microseconds.

We claim:

1. An electronic phase shifter comprising:
   a source of an input pulse train at a given frequency;
   means coupled to said source for changing the number of pulses in said train;
   a first dividing means coupled to said means for changing for dividing the number of pulses in the changed pulse train for providing a phase shift of a predetermined number of degrees;
   means coupled to said source for providing a second given frequency; and first mixing means coupled both to said first dividing means and to said means for providing a second given frequency for providing a first sum frequency, said sum frequency being phase shifted by said predetermined number of degrees.

2. Apparatus according to claim 1 further comprising a second dividing means coupled to the output of said first mixing means for dividing down the number of pulses produced by said first mixing means, the output of said second dividing means having a smaller phase shift in degrees than the output of said first dividing means.

3. Apparatus according to claim 2, further comprising a second mixing means coupled both to said second dividing means and to said means for providing a second given frequency for providing a second sum frequency, the output of said second mixing means being shifted in phase by said smaller degrees of phase shift.

4. Apparatus according to claim 1 wherein said means coupled to said source for providing a second given frequency comprises:
   another dividing means coupled to said source; and
   another mixing means coupled to the output of said another dividing means, the other input of said another mixing means being coupled to said source and the output of said another mixing means being coupled to said first mixing means.

5. Apparatus according to claim 1 further comprising:
   a plurality of dividing means;
   a plurality of mixing means;
   means coupling said plurality of dividing means and said plurality of mixing means alternately together in series, the first of said series combination being a dividing means;
   means coupling said first divider of said series combination to said first mixing means; and
   means coupling said plurality of mixing means to said source.

6. Apparatus according to claim 1 wherein said means for changing comprises:
   means for selectively inserting a pulse between two pulses of said input pulse train; and
   means for selectively deleting pulses from said input pulse train.

7. Apparatus according to claim 6 further comprising synchronizing means coupled to said source and to said means for changing for insuring that said selectively inserted pulses are properly inserted between pulses of said input train and that the deleting signal from said means for deleting overlaps the pulses of said input train that are to be deleted.

8. Apparatus according to claim 1 further comprising:
   a source of reference frequency;
   a phase detector coupled to said source of reference frequency and to said source of input pulse train for detecting the phase difference between the signals produced by said sources; and
   means coupling said phase detector to said means for changing for causing the phase shift of said phase shifting apparatus to vary responsive to said phase detector output.

9. The phase shifter according to claim 3 wherein the division ratios of said first and second dividers are the same and wherein said first and second sum frequencies are the same.

10. The phase shifter according to claim 9 wherein the division ratio of said another divider is the same as that of said first divider, said first and second sum frequencies and the ouput frequency of said phase shifter being the same as that of said source.

11. Apparatus according to claim 1 further comprising means coupled to said changing means for repeatedly periodically operating said changing means at a constant rate, thereby causing the phase shift to vary at a constant rate, the output signal of said phase shifter having a constant frequency different from the frequency of said source of input pulse train.

References Cited

UNITED STATES PATENTS

| | | | |
|---|---|---|---|
| 2,549505 | 8/1951 | Mohr | 328—155 |
| 2,714,705 | 8/1955 | Volz | 328—155 |
| 2,923,820 | 2/1960 | Liguori | 328—155 |
| 2,980,858 | 4/1961 | Grondin | 328—155 |
| 3,359,499 | 12/1967 | McDonough et al. | 328—155 |

JOHN S. HEYMAN, Primary Examiner

H. A. DIXON, Assistant Examiner

U.S. Cl. X.R.

307—232; 328—110